UNITED STATES PATENT OFFICE.

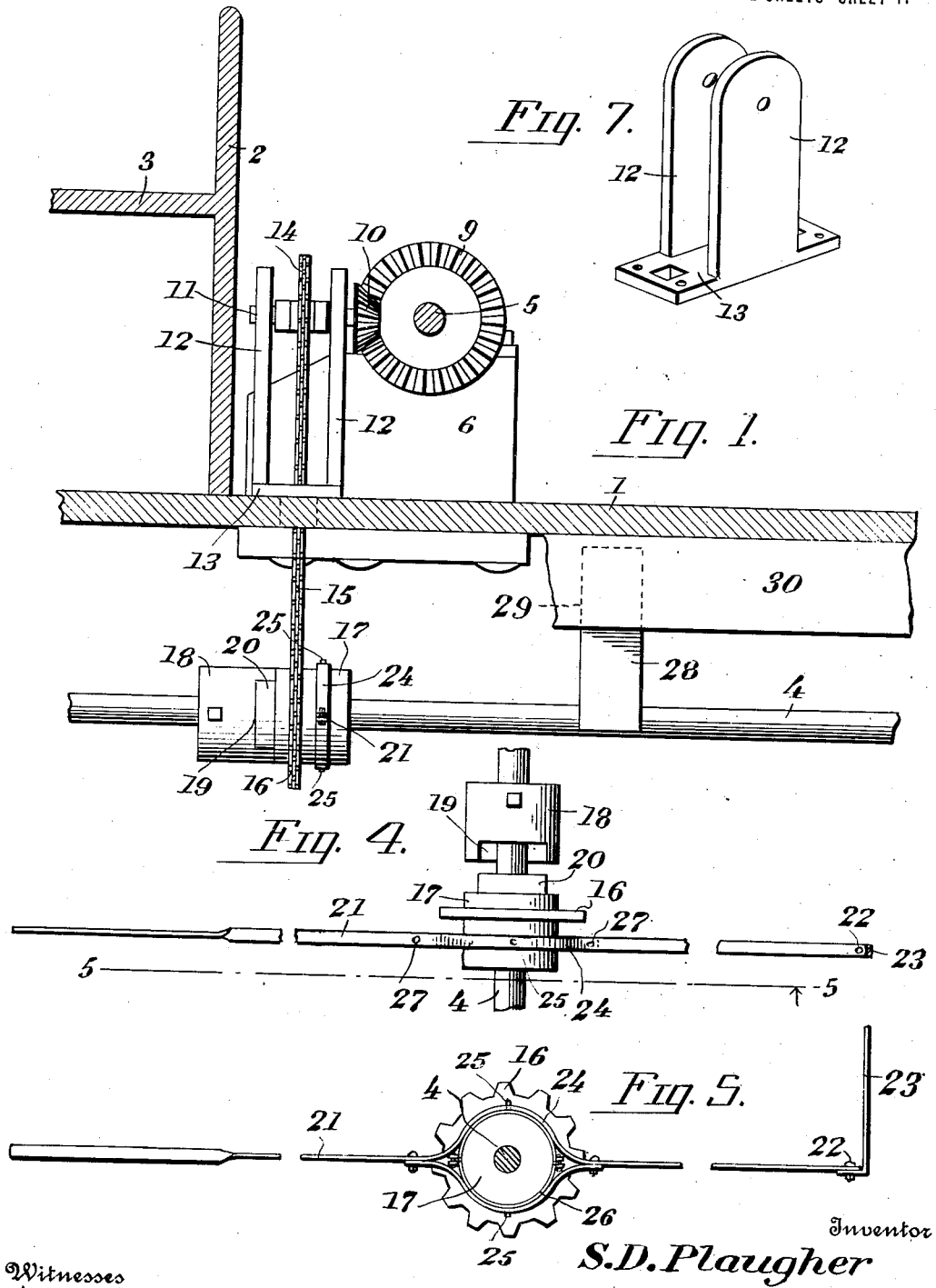

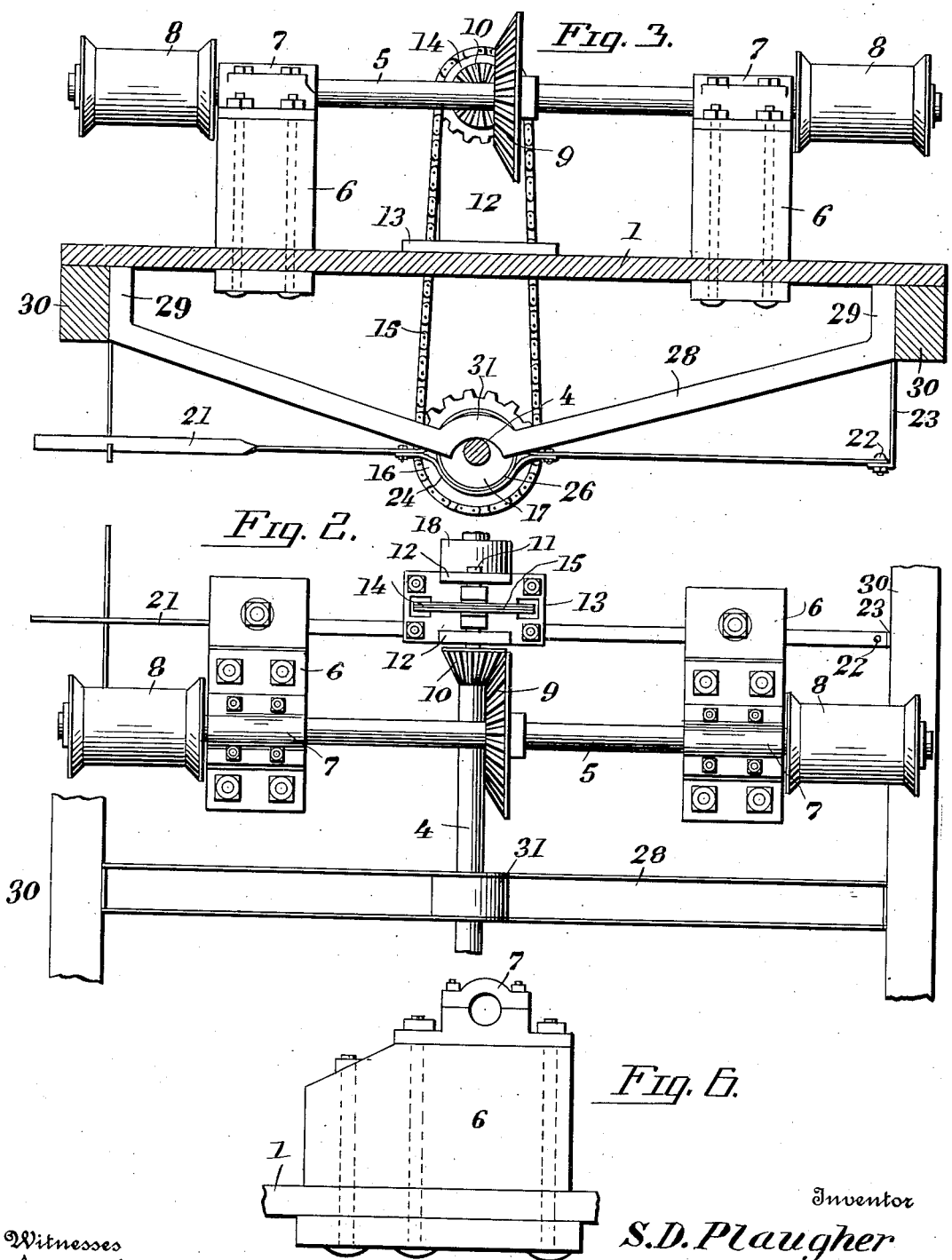

SHEM D. PLAUGHER, OF TAFT, CALIFORNIA.

LOADER FOR MOTOR-TRUCKS.

1,189,175.  Specification of Letters Patent.  Patented June 27, 1916.

Application filed August 26, 1913. Serial No. 786,754.

*To all whom it may concern:*

Be it known that I, SHEM D. PLAUGHER, a citizen of the United States, residing at Taft, in the county of Kern and State of California, have invented new and useful Improvements in Loaders for Motor-Trucks, of which the following is a specification.

This invention relates to loading devices for motor trucks, the object in view being to provide simple, powerful and reliable mechanism of the class referred to by means of which machinery and all kinds of stock and material may be loaded upon the truck with facility either at the rear or both sides of the truck, the invention being also adapted for use in pulling the truck in either direction out of any position where it may have become stuck or mired; also to perform the same operation in connection with another truck which has become stuck or mired either ahead or in rear of the truck equipped with the loading device.

A further object of the invention is to provide a construction of loading device which is applicable to any make of motor truck now on the market.

With the above and other objects in view, the invention consists in the construction, combination and arrangement of parts, as will hereinafter be more fully described, illustrated and claimed.

In the accompanying drawings:—Figure 1 is a vertical longitudinal section through a sufficient part of a motor truck to illustrate the application of the loading device of this invention thereto. Fig. 2 is a plan view of the same. Fig. 3 is a vertical cross section thereof. Fig. 4 is a plan view of the clutch mechanism below the floor or truck bed. Fig. 5 is a vertical cross section on the line 5—5 of Fig. 4. Fig. 6 is a detail elevation of one of the anchor or bearing blocks. Fig. 7 is a detail perspective view of the pinion shaft bearer.

Referring to the drawings, 1 designates the truck bed or floor, 2 the front part of the truck body and 3 the driver's seat.

4 designates the drive shaft of the machine by means of which the power of the motor is imparted to the driving wheels of the machine, the construction thus far referred to being the same as that in common use on motor trucks of the present day.

In carrying out the present invention, I provide a winding or drum shaft 5 extending transversely of the truck bed just in rear of the head board 2 as shown in Fig. 1, said shaft being mounted adjacent to its opposite ends in anchor or bearing blocks 6 provided with detachable bearing caps 7 to enable the drum shaft 5 to be removed and replaced. At each end the shaft 5 has thereon a winding drum 8 the outer end of which is preferably located within the vertical plane of the adjacent side edge of the truck body, the drum 8 being adapted to receive a cable or rope for hoisting, loading or pulling purposes.

Fast on the shaft 5 at or near the center of the truck is a bevel gear wheel 9 which meshes with a driving pinion 10 fast on a pinion shaft 11, said pinion shaft being journaled in the two upwardly extending and substantially parallel arms 12 of a pinion shaft bearer, the latter also comprising a base 13 connecting the arms 12 and bolted or otherwise fastened to the truck bed in fixed relation to the latter. Between the arms 12, the pinion shaft 11 has fast thereon a sprocket wheel 14 around which runs a chain 15 which extends downwardly through the truck bed where it passes around a driving sprocket wheel 16 on a collar 17 slidable lengthwise of the drive shaft 4. Fast on the same shaft 4 is a fixed clutch collar 18 having a clutch face 19 with which a corresponding clutch face 20 on the slidable collar 17 is adapted to engage.

In order to shift the collar 17, I provide a horizontal manually operated lever 21 extending transversely across the truck beneath the floor level as shown in Fig. 3, said lever being pivotally mounted at one end as shown at 22 on a bracket 23 fastened to the truck frame. At a point adjacent to the drive shaft 4, the lever 21 is formed with an annular portion or strap 24 which encircles the collar 17 and is provided with diametrically opposite holes to receive radial pins 25 on a split band 26 clamped around the collar 17 by means of bolts 27.

28 designates an inverted V-shaped brace the end portions 29 of which are bent upwardly and secured to the side sills 30 of the truck frame. Centrally the brace 28 is formed with an arched portion 31 which extends over the drive shaft 4 at a short distance from the winding or drum shaft 5 as shown in Figs. 1 and 2, the brace 28 being thus adapted to hold down and support the shaft 4 when the loading device is in operation and an upward stress or pull is imparted to the shaft 4 by the chain 15 passing around the sprocket wheel 16.

From the foregoing description it will now be understood that by means of the manually operated clutch above described, the winding or drum shaft 5 may be readily thrown into and out of operation and when in operation, cables or ropes may be wound around one or both of the drums 8 for the purpose of pulling the truck out of any place in which it has become stuck or mired. The mechanism is also equally useful for performing a similar operation on other trucks or vehicles. When the loading device is not in use, all parts thereof are out of operation and therefore throw no additional burden or resistance on the motor of the truck.

What is claimed is:—

The combination with a motor truck and a drive shaft extending longitudinally of the truck, of a rotary drum shaft extending transversely of the truck, drums at opposite sides of the center of the last named shaft, a countershaft parallel to said drive shaft and at a right angle to said drum shaft and geared directly to the latter between the drums thereof, a sprocket chain forming a driving connection between said drive shaft and countershaft, a truss-like brace connecting the side truck bars and arched over said drive shaft, a manually controlled clutch on the drive shaft for throwing said drive chain and drum shaft into and out of operation, and a sprocket face on said clutch around which said chain passes.

In testimony whereof I affix my signature in presence of two witnesses.

SHEM D. PLAUGHER.

Witnesses:
A. W. ALBRECHT,
THOMAS HOY.